(12) United States Patent
Takahashi et al.

(10) Patent No.: US 7,241,055 B2
(45) Date of Patent: Jul. 10, 2007

(54) ADAPTOR UNIT AND OPTICAL PLUG

(75) Inventors: Tetsuo Takahashi, Kanagawa (JP); Manabu Komatsubara, Kanagawa (JP)

(73) Assignee: Canare Electric Co., Ltd., Aichi-gun, Aichi (JP)

( * ) Notice: Subject to any disclaimer, the term of this patent is extended or adjusted under 35 U.S.C. 154(b) by 0 days.

(21) Appl. No.: 11/105,365

(22) Filed: Apr. 14, 2005

(65) Prior Publication Data
US 2005/0232549 A1 Oct. 20, 2005

(30) Foreign Application Priority Data
Apr. 15, 2004 (JP) .............................. 2004-120752

(51) Int. Cl.
*G02B 6/26* (2006.01)
(52) U.S. Cl. .............................. 385/55; 385/56; 385/60; 385/66
(58) Field of Classification Search ............ 385/53–56, 385/58–64, 66–72
See application file for complete search history.

(56) References Cited
U.S. PATENT DOCUMENTS
| | | | |
|---|---|---|---|
| 4,699,458 A | | 10/1987 | Ohtsuki et al. |
| 5,066,096 A | | 11/1991 | Krausse |
| 5,724,466 A | * | 3/1998 | Rickenbach et al. .......... 385/60 |
| 2002/0025121 A1 | * | 2/2002 | Stephenson et al. .......... 385/55 |
| 2002/0172467 A1 | * | 11/2002 | Anderson et al. ............. 385/53 |

FOREIGN PATENT DOCUMENTS
| | | |
|---|---|---|
| EP | 1 394 584 A2 | 3/2004 |
| JP | 62-032407 | 12/1987 |

OTHER PUBLICATIONS
European search report dated Dec. 30, 2005.

* cited by examiner

*Primary Examiner*—Kevin S. Wood
(74) *Attorney, Agent, or Firm*—McGinn IP Law Group, PLLC

(57) ABSTRACT

A screwing part 1220 is inserted into a large through-hole 1110 from its front side and is screwed together with a male screw part of a jig. A convex part 1230 in an approximately ring shape is formed at a back end part of the screwing part 1220. The convex part 1230 is adjacent to a fitting part 1111 which is made of an approximately ring convex part projecting toward inside of the large through-hole 1110. The back of the fitting part 1111 is adjacent to a front end opening part 1310 of a back tubular part 1300. In short, the fitting part 1111 of the adaptor main body 1110 is sandwiched between the convex part 1230 and the front end opening part 1310. By inserting and pressing the back end opening part 1210 of the front tubular part 1200 into the front end opening part 1310 of the back tubular part 1300, the front tubular part 1200 and the back tubular part 1300 are connected and fixed with each other. Sign β represents their pressing part.

19 Claims, 14 Drawing Sheets

ADAPTOR UNIT AND OPTICAL PLUG

TECHNICAL FIELD

The present invention relates to an adaptor unit comprising an optical plug which connects each front facet of two ferrules facing with each other and is installed at either male or female opening part.

BACKGROUND ART

Conventionally, a Japanese Utility Patent Application Laid-open No. H6-2306 has disclosed an adaptor unit comprising an optical plug which connects each front facet of two ferrules facing with each other and is installed at either male or female opening part in its FIGS. 1 and 2. FIG. 9 of the present application illustrates its structure. The adaptor (19) comprising components such as a dividing sleeve (22) disclosed in the Japanese Utility Patent Application Laid-open No. H6-2306 has been common and well-known.

Recently, as shown in FIGS. 10A-10C, a dividing sleeve unit (u1) is formed by using an approximately tubular dividing sleeve holder (K1, K2) comprising a dividing sleeve (S), and an assembly of components (referred as an adaptor unit hereinafter) in which the dividing sleeve is held indirectly by the main body of the insulation adaptor through a dividing sleeve holder of the dividing sleeve unit (u1) tends to be installed at an opening part of the optical plug or the optical connector.

In the Japanese Utility Patent Application Laid-open No. H6-2306A, a dividing sleeve unit comprising such a structure is illustrated as an alignment tube or an alignment device, and examples for constructing an elastic contact which is used along with the dividing sleeve are also disclosed.

FIG. 11 is a side and sectional view of an adaptor unit 19' of a general optical connector (optical plug 10') which is consisted by using such dividing sleeve unit (alignment device; u1) and has been well-known widely in Japan. The dividing sleeve unit u1 in FIG. 11 is inserted and installed in a large through-hole h of the adaptor unit 19'. A tubular main body 2 comprising a ferrule holder 13 which holds a ferrule 18, or a contact point (: the optical contact unit), has a groove g2 formed in an approximately ring shape on the external surface of the opening part of the front end part 3. The dividing sleeve unit u1 fits a projection part g1 which is formed in an approximately ring shape at the back opening part of the dividing sleeve holder K1 illustrated in FIG. 10C with the groove g2 at a point γ illustrated in FIG. 11. As a result, the dividing sleeve unit u1 is fixed in the large through-hole h of the adaptor unit 19'.

A male screw K1a formed on the external surface of the dividing sleeve holder K1 can screw together with a female screw which is formed at the end point of a jig in an approximately cylindrical bar shape. By pulling the jig while the male screw and the female screw remain screwing with each other, the groove g2 and the projection part g1 fitting together at the point γ can be released, and further the dividing sleeve unit u1 can be pulled out of the optical plug 10' from the opening part 10a. By employing that process, maintenance, or inspection for dirt or stain, and cleaning with tools such as a commercially available cotton-tipped swab can be carried out toward the front facet of the ferrule 18.

The Japanese Patent Application Laid-open No. 2001-749776 discloses more detailed structure of the elastic contact point which holds the ferrule 18 in the optical axis direction with elasticity. That is, for example, sign 12 represents a hole of the groove formed in the tubular main body 2.

DISCLOSURE OF THE INVENTION

Problems to be Solved

In order to use the conventional optical plug 10', however, each process for taking out the dividing sleeve unit u1 from the opening part 10a should be carried out individually at each ferrule 18. Accordingly, with respect to an optical connector comprising plural ferrules, process for releasing the dividing sleeve unit should be repeated for plural times to maintain the front facet of each ferrule. Consequently, efficiency for maintaining each ferrule front facet becomes worse.

In the conventional optical plug 10', each adaptor unit 19' is left at the optical plug 10' side even after each dividing sleeve unit u1 is released. In an urgent situation in its maintenance or operation, dirt or stain at the front facet of the ferrule 18 tends not to be easily and rapidly found out depending on its brightness condition. In short, the conventional optical plug 10' has not been desirable.

The present invention has been accomplished in order to overcome the aforementioned drawbacks. An object of the present invention is to provide an adaptor unit functioning as an optical connector which can be efficiently and easily maintained.

Here, each object listed above may be enough to be fulfilled individually by at least one of each method described above, and each invention in the present application is not necessarily secure that there is a solution which solves all the problems at once.

Means of Solving the Problem

In order to solve the above-described problems, the following methods may be effective.

That is, the first aspect of the present invention is an adaptor unit comprising an optical plug which connects each front facet of two ferrules facing with each other and is installed at either male or female opening part, comprising: a dividing sleeve which includes each front facet of two ferrules and holds each front ferrules facing with each other in connecting process; an approximately cylindrical dividing sleeve holder which includes and holds the dividing sleeve; and an adaptor main body which holds the dividing sleeve holder by including at least a portion of the dividing sleeve holder, wherein a fitting part which fits with the dividing sleeve holder to restrain movement of the driving sleeve holder at least in the optical axis direction is formed at the adaptor main body, the dividing sleeve holder comprises a front tubular part and a back tubular part which is adjacent and fixed to the front tubular part, and an engagement part which can be freely put on and taken off to connect with a predetermined jig is formed in at least one of the front tubular part of the dividing sleeve holder.

The second aspect of the present invention is that the adaptor unit includes plural dividing sleeve holders each of which is formed in an approximately cylindrical shape and includes and holds the dividing sleeve. Here, the engagement part may not be necessarily formed on all of the plural dividing sleeve holders. Alternatively, the engagement part may be comprised in only one dividing sleeve holder. At that time, the dividing sleeve holder comprising the engagement part may be recognized by coloring or marking. That enables to obtain actions and effects of the present invention.

The third aspect of the present invention is that a screwing part which screws the engagement part with the jig is formed and that the screw axis direction of the screwing part approximately corresponds to the optical axis direction.

The fourth aspect of the present invention is that the fitting part is made of a convex part which projects to the axis side of the dividing sleeve holder and that the convex part is sandwiched between the front tubular part and the back tubular part in the optical axis direction.

The fifth aspect of the present invention is that the convex part is formed in an approximately ring shape around the axis which corresponds to the axis of the dividing sleeve holder.

The sixth aspect of the present invention is that the back end opening part of the front tubular part is installed inside of the front end opening part of the back tubular part.

The seventh aspect of the present invention is that the front tubular part and the back tubular part are connected and fixed with each other by inserting and pressing the back end opening part into the front end opening part.

The eighth aspect of the present invention is that a rotational asymmetry part is formed at the external surface of the dividing sleeve holder which is asymmetric to rotation around the axis of the dividing sleeve holder and that a rotation preventing pat contacting to the rotational asymmetry part is formed at the adaptor main body. Here, rotational asymmetry is that a sectional plane vertical to the rotational axis is not a circular shape. Accordingly, rotational asymmetry includes rotational symmetry rotating at an angle of 180° or 90°.

The ninth aspect of the present invention is the rotational asymmetric part and the rotation preventing part are two parallel planes sandwiching the axis of the dividing sleeve holder.

The tenth aspect of the present invention is that the optical plug which connects each front facet of two ferrules facing with each other comprises the adaptor unit.

Through employment of the aforementioned aspects of the present invention, the aforementioned drawbacks can be overcome effectively and rationally.

EFFECT OF THE INVENTION

Effects to be obtained by the present invention are explained as follows.

That is, according to the first aspect of the present invention, the adaptor main body and the dividing sleeve holder are fit at the fitting part and the dividing sleeve holder and a predetermined jig are also fit at the fitting part. When the jig is connected to the dividing sleeve holder, the whole body of the adaptor unit can be taken out from the opening part of the optical connector only by pulling the jig.

Accordingly, by employing the first embodiment of the present invention, the portion around the front facet of the ferrule can be easily and rapidly opened remarkably wide in an urgent situation in its maintenance or operation, and that enables to find out dirt or stain at the front facet of the ferrule easily and rapidly. Consequently, maintenance efficiency of the optical plug or the optical connector can be remarkably improved.

According to the second aspect of the present invention, each dividing sleeve holder is fit to the fitting part of the adaptor main body. That enables to expose each front facet of all the ferrules at front side of the opening part of the optical plug by pulling the jig only once.

As a result, frequency of operating the jig may be decreased in fewer than half in maintenance of the optical plug comprising plural ferrules, and maintenance efficiency of the optical plug can be improved.

Alternatively, fitting structure in which a male screw and a female screw are screwed together (the third aspect of the present invention) can be employed for forming the fitting part described above concretely and easily. The fitting part, however, may not be necessarily have those structures in the present invention but can have other structure.

On carrying out the first and the second aspects of the present invention, however, the fitting part can also have, for example, the conventional structure shown in FIG. 11 comprising the male screw K1a. When the fitting part has the conventional structure shown in FIG. 11, it becomes not necessary to develop any new jig and also it becomes easier and surer to form the fitting part. Those are desirable.

According to the fourth aspect of the present invention, the convex part is sandwiched between the front tubular part and the back tubular part in the optical axis direction and movement of the dividing sleeve holder in the optical axis direction is effectively restrained by simple structure. Accordingly, by employing the fourth aspect of the present invention, it becomes easier to design fitting structure of the adaptor main body and the dividing sleeve holder in concrete and in detail, to form each component and to compose members of the unit.

According to the fifth aspect of the present invention, the adaptor main body and the dividing sleeve holder can contact with each other around the dividing sleeve holder in the axis direction. That enables to fix the adaptor main body and the dividing sleeve holder more firmly with each other at least in the optical axis direction.

According to the sixth aspect of the present invention, the end part such as the end of the front end opening part of the back tubular part can be adjusted to the fitting part. Alternatively, the fitting part may be formed on the external surface of the front tubular part and then the side wall of backside of the fitting part can be adjusted to the fitting part.

Accordingly, by employing the sixth aspect of the present invention, the fitting part of the adaptor main body and the dividing sleeve holder can be obtained at a limited and small space in the adaptor main body.

Structure for connecting and fixing the front tubular part and the back tubular part may be arbitrary. For example, they can be fixed by pressing and screwing together. Especially, by inserting, screwing and pressing the back end opening part into the front end opening part (the seventh aspect of the present invention), it becomes easier to design, manufacture, and compose the dividing sleeve holder.

According to the eighth aspect of the present invention, the rotational asymmetric part is adjacent to the rotation preventing part, and rotation of the dividing sleeve holder can be prevented. As a result, the dividing sleeve holder (and the whole body of the dividing sleeve unit) can be fixed in the adaptor main body sufficiently.

According to the ninth aspect of the present invention, the rotational asymmetric part and the rotation preventing part which sufficiently prevent rotation of the dividing sleeve holder can be formed effectively and easily without restraining miniaturization of the adaptor main body. Also, because both planes which face sandwiching the axis of the cable adaptor and are approximately parallel with each other are formed in the same shape and the same size, two right angles (half-turn) around the axis shows rotational symmetry. And the cable adaptor can be composed at two positions, or both at 0° and 180° positions in the circle around the axis.

Consequently, rotational direction for composing the cable adaptor may not be limited in one way, which enables to obtain excellent composing efficiency.

According to the tenth aspect of the present invention, maintenance, or inspection for dirt or stain, and cleaning toward the front facet of the ferrule can be carried out easily and rapidly. That improves efficiency of practical operation of the unit.

Moreover, other actions and effects of the optical contact unit described above can also be obtained.

BEST MODE FOR CARRYING OUT THE INVENTION

Embodiments of the present invention will next be described based on concrete examples. The scope of the present invention, however, is not limited to the embodiment described below.

FIRST EMBODIMENT

Figure 1A:
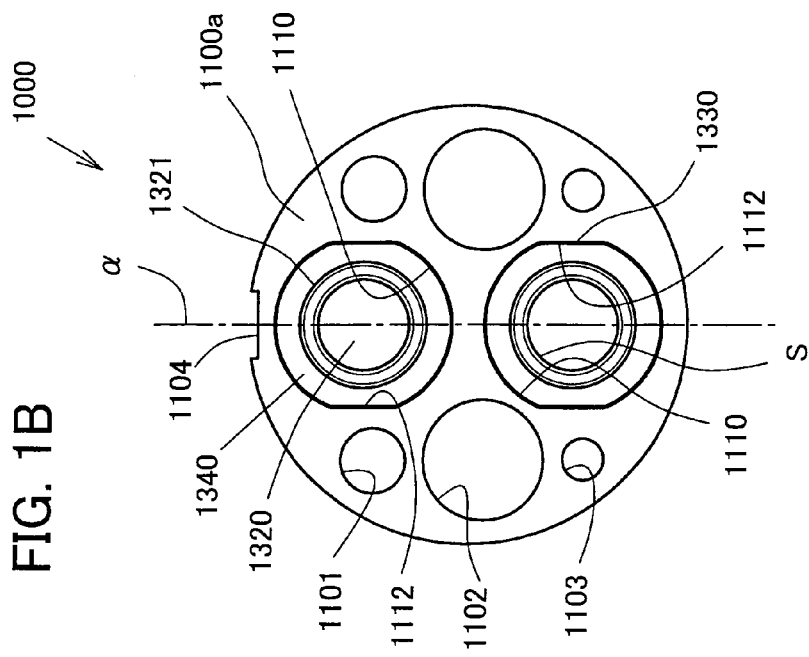
FIG. 1A is a side view of an adaptor unit 1000 in the first embodiment of the present invention.

FIG. 1A is a side view of an adaptor unit 1000 in the first embodiment of the present invention. An adaptor main body 1100 is made of an insulator, and a shallow groove 1104 is formed in the optical axis direction at the upper portion of its' external surface formed in an approximately cylindrical shape. And a further shallow step 1105 is formed at the external surface of the cylindrical main body in circular direction. From the bottom surface 1100a of the adaptor main body 1100, each back end part 1320 of two dividing sleeve holders 1300 in total, each of which formed in an cylindrical shape, sticks out backward. A hill part 1321 is formed in an approximately ring shape at the external surface of the back end part 1320.

Figure 1B:
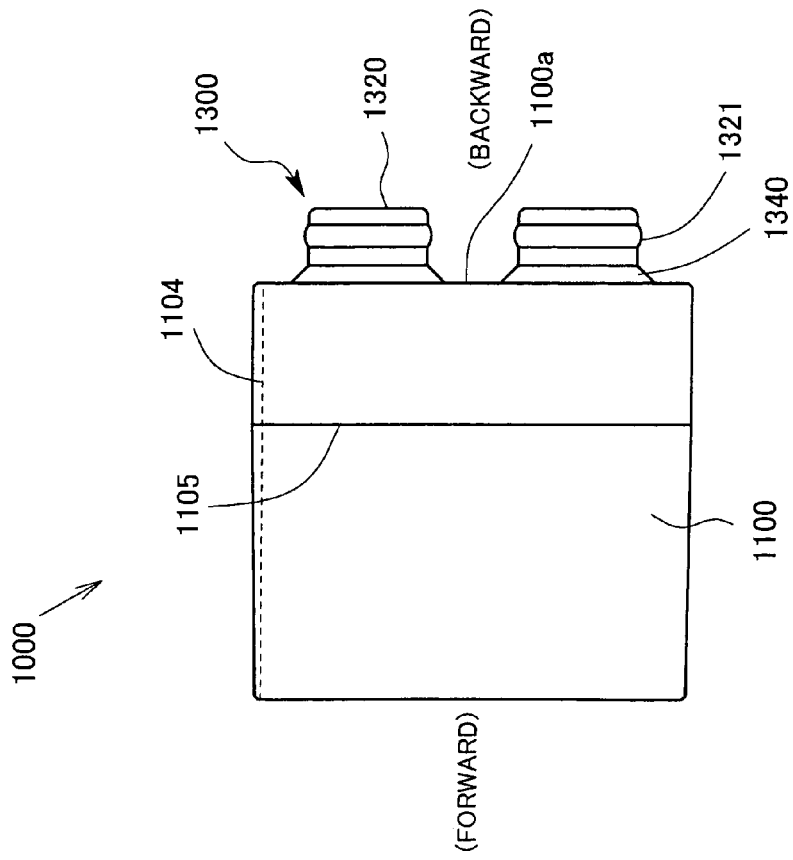
FIG. 1B is a back view of the adaptor unit 1000 in the first embodiment of the present invention.

FIG. 1B is a back view of the adaptor unit 1000 in the first embodiment of the present invention. Each adaptor unit 1000 is formed approximately symmetrical to a sectional plane α. Six through-holes (1101, 1102, 1110) in total are formed in the adaptor main body 1100 in each size. Each kind of component such as a metal pin which constructs a contact point for electric wiring is inserted and installed in the through-holes 1101 and 1102.

The dividing sleeve holder of the present invention is inserted and installed in the large through-hole 1110 having the largest diameter. A rotation preventing part 1112 is formed at a portion of the large through-hole 1110. The rotation preventing part 1112 contacts to a rotational asymmetric part 1330 installed on the external surface of the back tubular part 1300 of the dividing sleeve. The rotation preventing part 1112 distributes to keep an equivalently wide area for forming the through-hole 1101 with predetermined durability. Here, signs S and 1340 represent a dividing sleeve and a leaning shoulder part of the back tubular part 1300, respectively.

Figure 2:
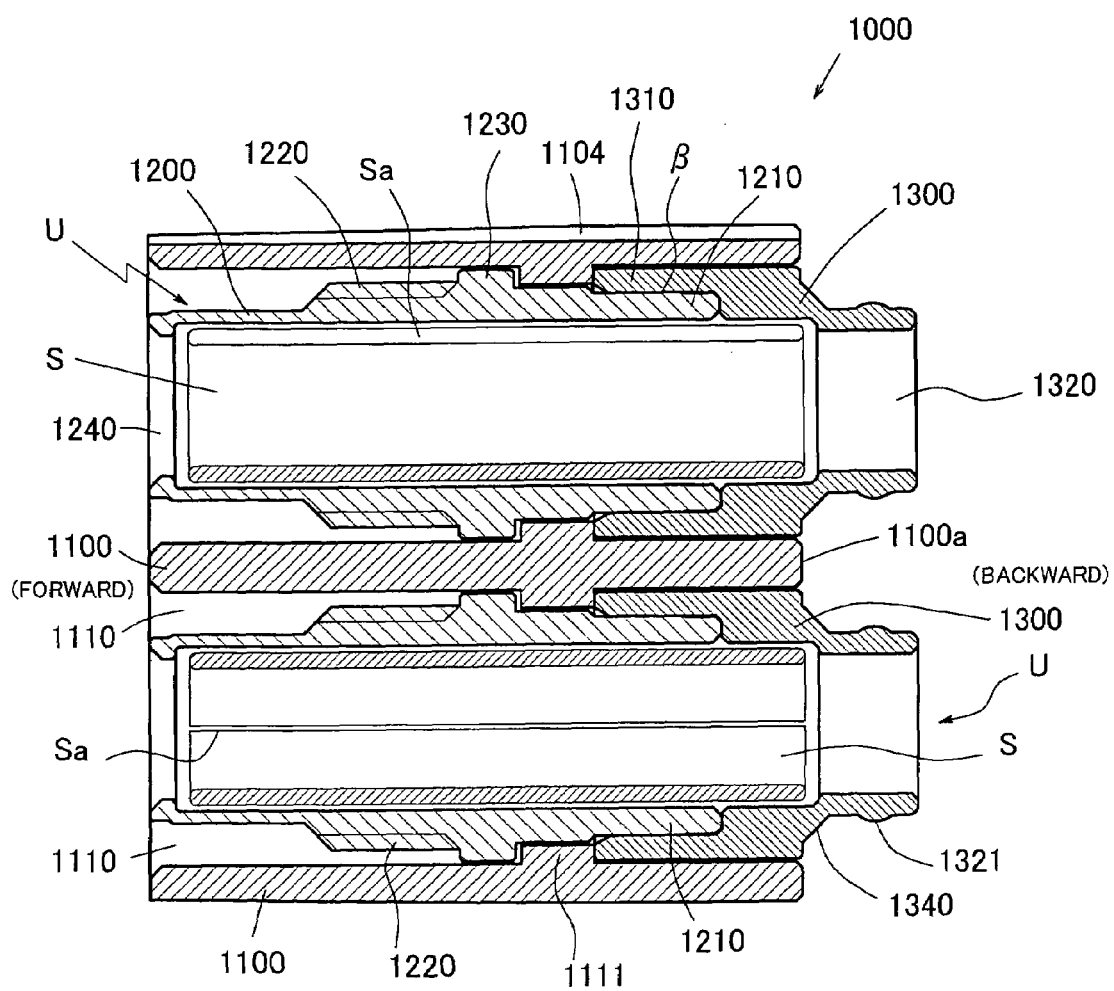
FIG. 2 is a sectional view of the adaptor unit 1000.

FIG. 2 is a sectional view of the adaptor unit 1000 at a sectional plane α. The upper portion and the lower portion of the adaptor unit 1000 are formed approximately symmetric at the sectional plane α except for existence of a groove 1104. As shown in the sectional view of FIG. 2, the adaptor unit 1000 comprises one adaptor main body 1100 and two dividing sleeve units U. Here, one dividing sleeve unit U has a dividing sleeve S and a dividing sleeve holder comprising it, and a dividing sleeve holder has a front tubular part 1200 and a back tubular part 1300.

The dividing sleeve S has a slit Sa which inns in the optical axis direction. A screwing part 1220 is a male screw which is formed on the external surface of the approximately cylindrical front tubular part 1200, and its screwing axis corresponds to the axis of the dividing sleeve S formed in an approximately ring shape. The screwing part 1220 is inserted forward into the large through-hole 1110 and screws together with a female screw part of jig 1225, shown schematically in FIG. 4. As the jig, a well-known jig which is formed in an approximately cylindrical bar and has a female part at its end can be used.

And an approximately ring convex part 1230 is formed at the back end part of the screwing part 1220. The convex part 1230 is adjacent to the fitting part 1111 which is an approximately ring convex part projecting inward of the large through-hole 1110. The back end of the fitting part 1111 is adjacent to a front opening part 1310 of the back tubular part 1300. In short, the fitting part 1111 of the adaptor main body 1100 is sandwiched between the convex part 1230 and the front opening part 1310.

By inserting, fitting and pressing the back end opening part 1210 of the front tubular part 1200 into the front end opening part 1310 of the back tubular part 1300, the front tubular part 1200 and the back tubular part 1300 are connected and fixed with each other. Sign β shows an injection part in which the back end opening part 1210 is pressed.

Figure 3:
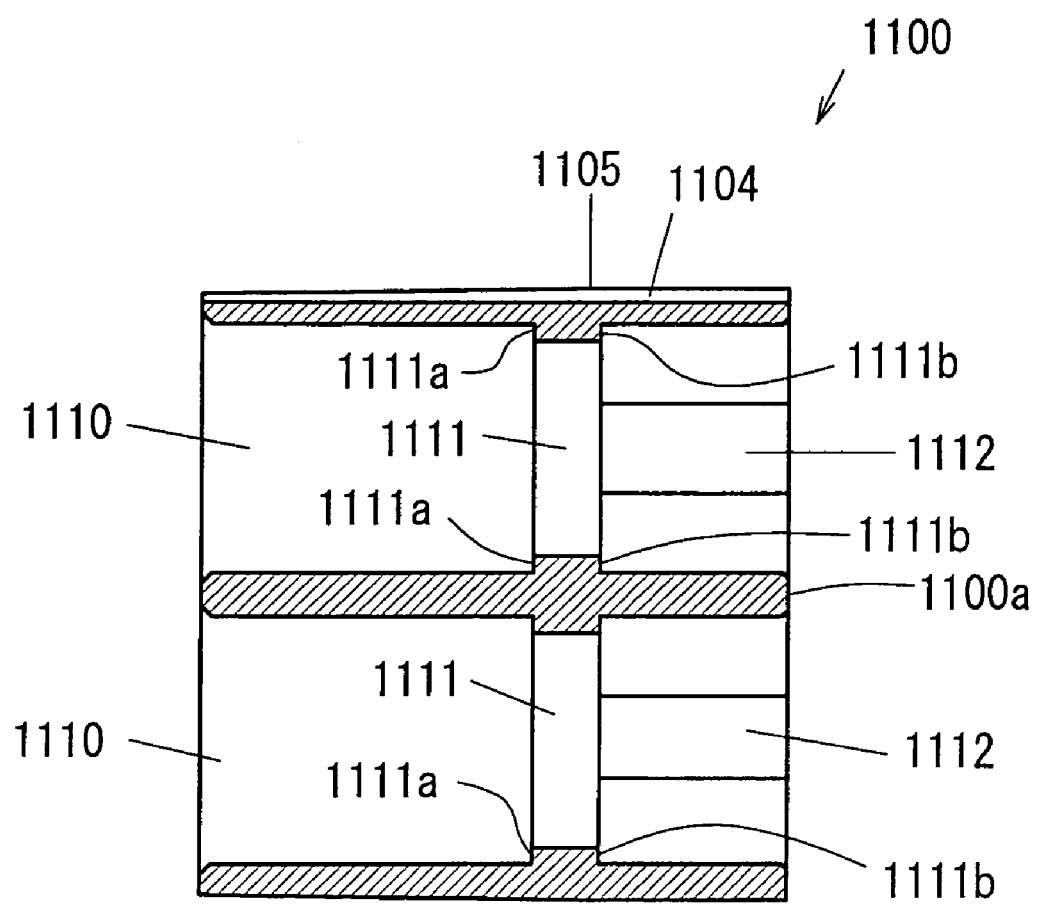
FIG. 3 is a sectional view of an adaptor main body 1100 of the adaptor unit 1000.

FIG. 3 is a sectional view of the adaptor main body 1100 of the adaptor unit 1000 at the sectional plane α. The fitting part 1111 exists almost in the center of the large through-hole 1110 of the adaptor main body 1100, and its front surface is an adjacent plane 1111a which corresponds to a portion adjacent to the front end opening part 1310. A rotation preventing part 1112 is parallel to the sectional plane α. The rotation preventing part 1112 makes an angle of about 40° in circumferential direction from the axis of the approximately ring fitting part 1111, or the axis of the dividing sleeve S. When this angle is too small, rotation of the back tubular part 1300 can hardly be prevented sufficiently.

Figure 4:
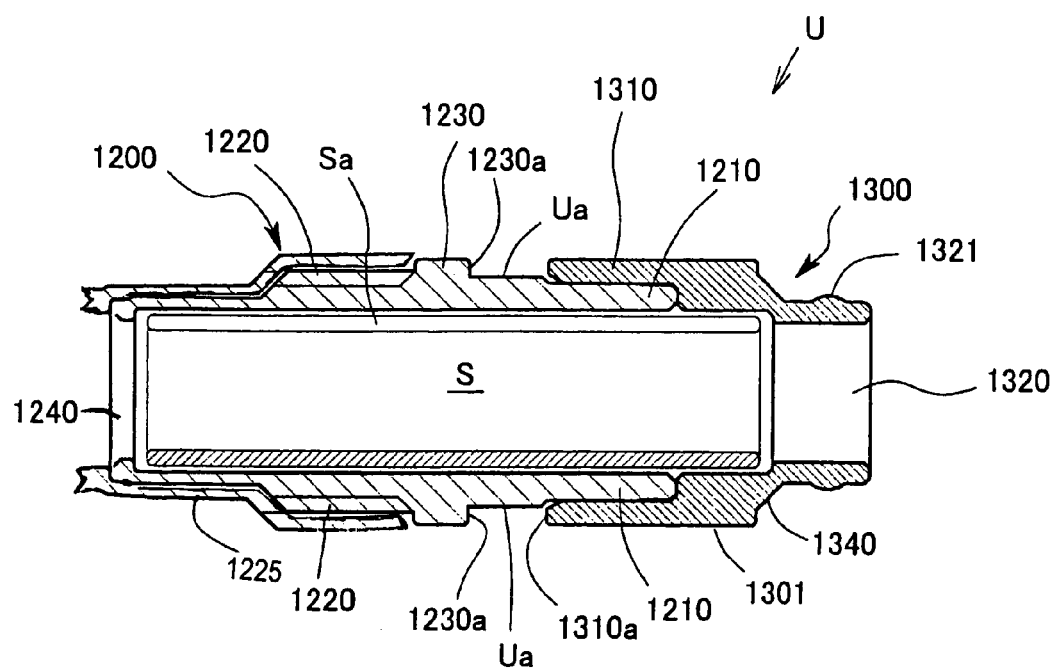
FIG. 4 is a sectional view of a dividing sleeve unit U.

FIG. 4 is a sectional view of the dividing sleeve unit U at the optical axis. Ua represents a concave part, which is a groove formed on the external surface of the dividing sleeve holder made of the front tubular part 1200 and the back tubular part 1300. The bottom plane of the concave part Ua is formed with the external surface of the approximately cylindrical front tubular part 1200, the front side plane of the concave part Ua is formed with the back end adjacent plane 1230a of the convex part 1230, and the back side plane of the concave part Ua is formed with the front end adjacent plane 1310a of the front end opening part 1310. In short, the concave part Ua sufficiently fits with the fitting part 1111 formed with the approximately ring convex part. Similar to the conventional invention, the concave part Ua efficiently fits with the fitting part 1111 leaving a proper amount of play in the diameter direction of the concave part Ua formed in an approximately ring shape. The play in the diameter direction helps to insert other ferrule B smoothly from the front end opening part 1240 of the front tubular part 1200.

Figure 5B:
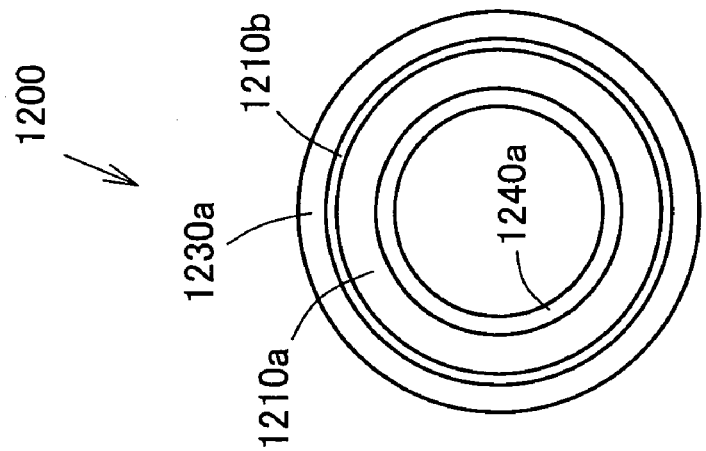
FIG. 5B is a back view of the front tubular part 1200 of the dividing sleeve holder.
Figure 5A:
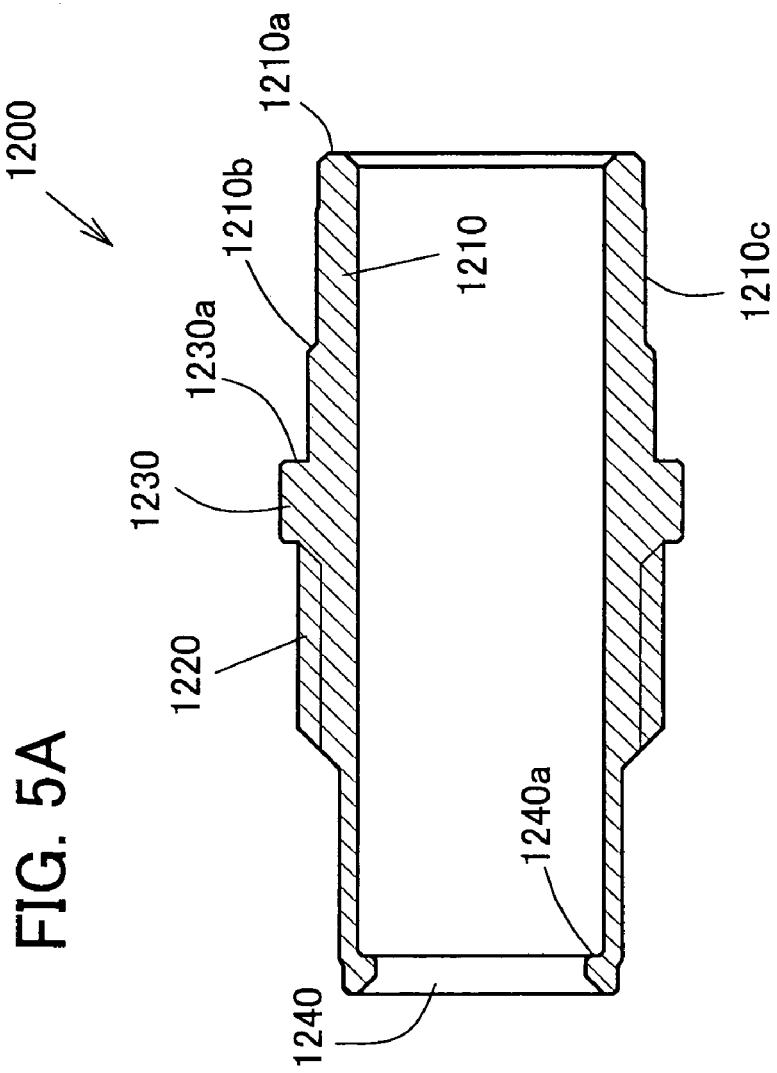
FIG. 5A is a sectional view of a front tubular part 1200 of the dividing sleeve holder.
Figure 5C:
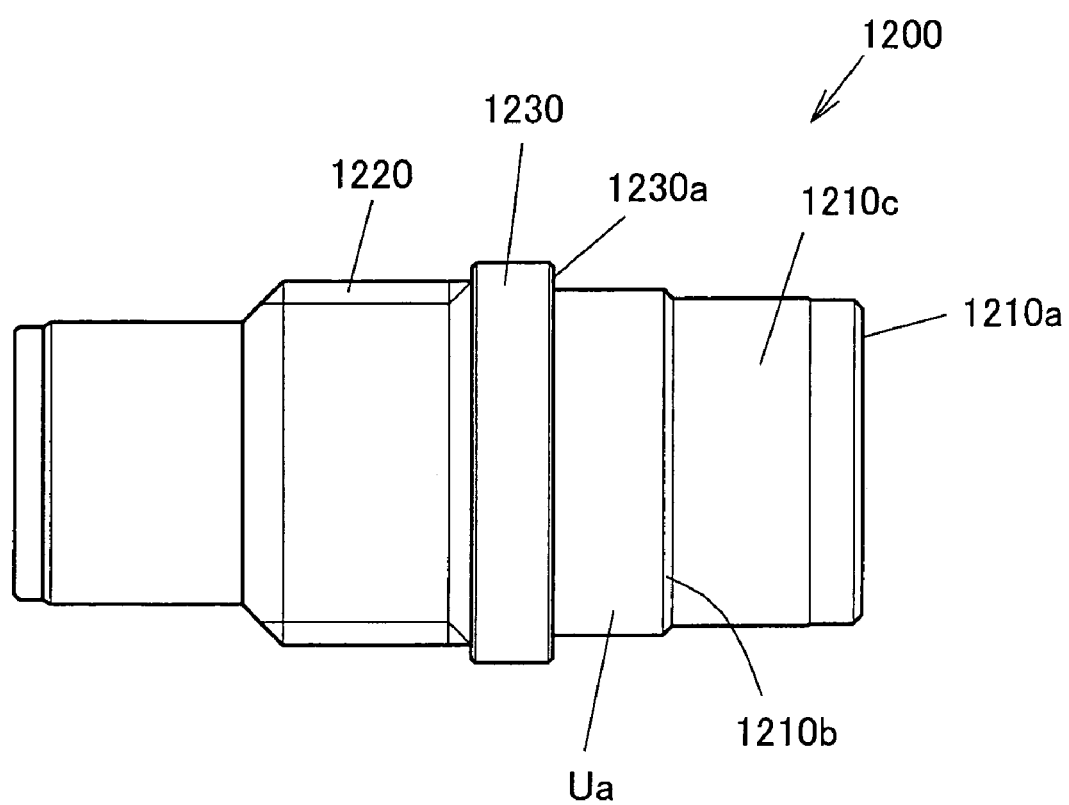
FIG. 5C is a side view of the front tubular part 1200 of the dividing sleeve holder.

FIGS. 5A, 5B and 5C are a sectional view, a back view and a side view of the front tubular part 1200 of the dividing sleeve holder, respectively. By forming an approximately ring convex part which projects inward, or to the axis direction, at the front end opening part 1240, the adjacent plane 1240a which prevents releasing the dividing sleeve unit S is formed. An inclined part 1210b is formed uniformly in circumferential direction at the front end of the external surface 1210c of the back end opening part 1210 which is pressed into the front end opening part 1310 of the back tubular part 1300. Because the front end adjacent plane 1310a of the front end opening part 1310 contacts to the inclined part 1210b, inserting process can be completed without changing the shape of each component such as the front tubular part 1200 and the back tubular part 1300.

Figure 6B:
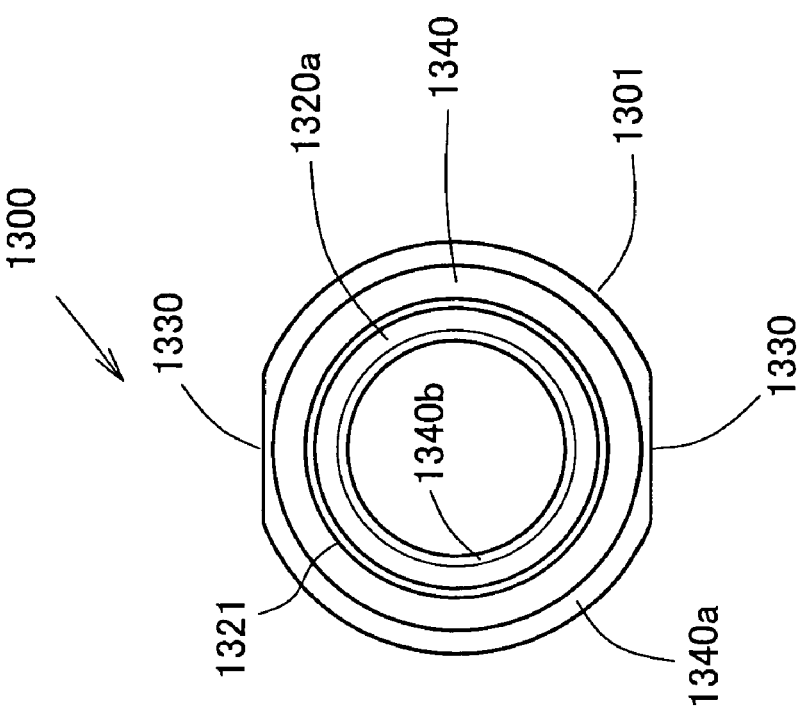
FIG. 6B is a back view of the back tubular part 1300 of the dividing sleeve holder.
Figure 6A:
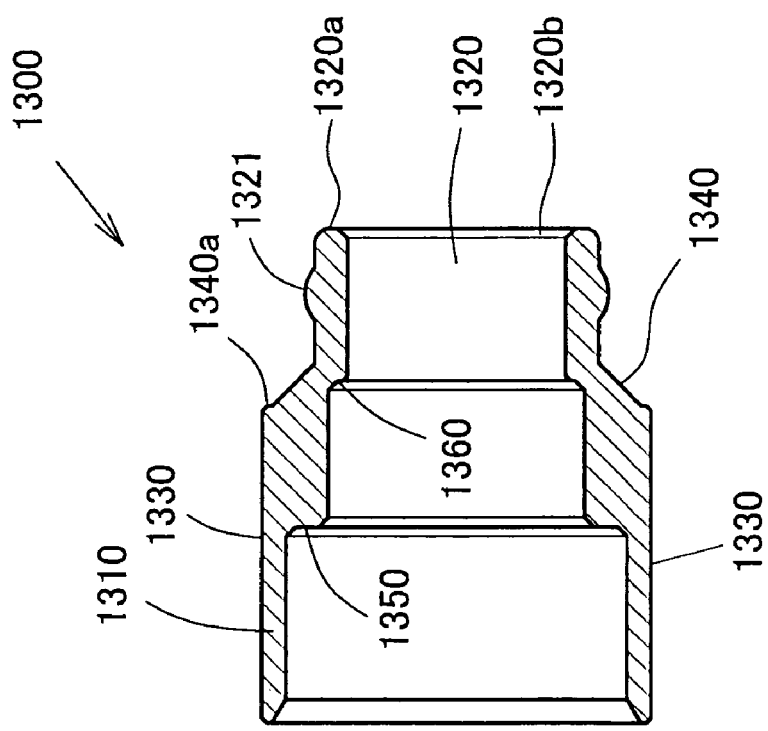
FIG. 6A is a sectional view of a back tubular part 1300 of the dividing sleeve holder.
Figure 6C:
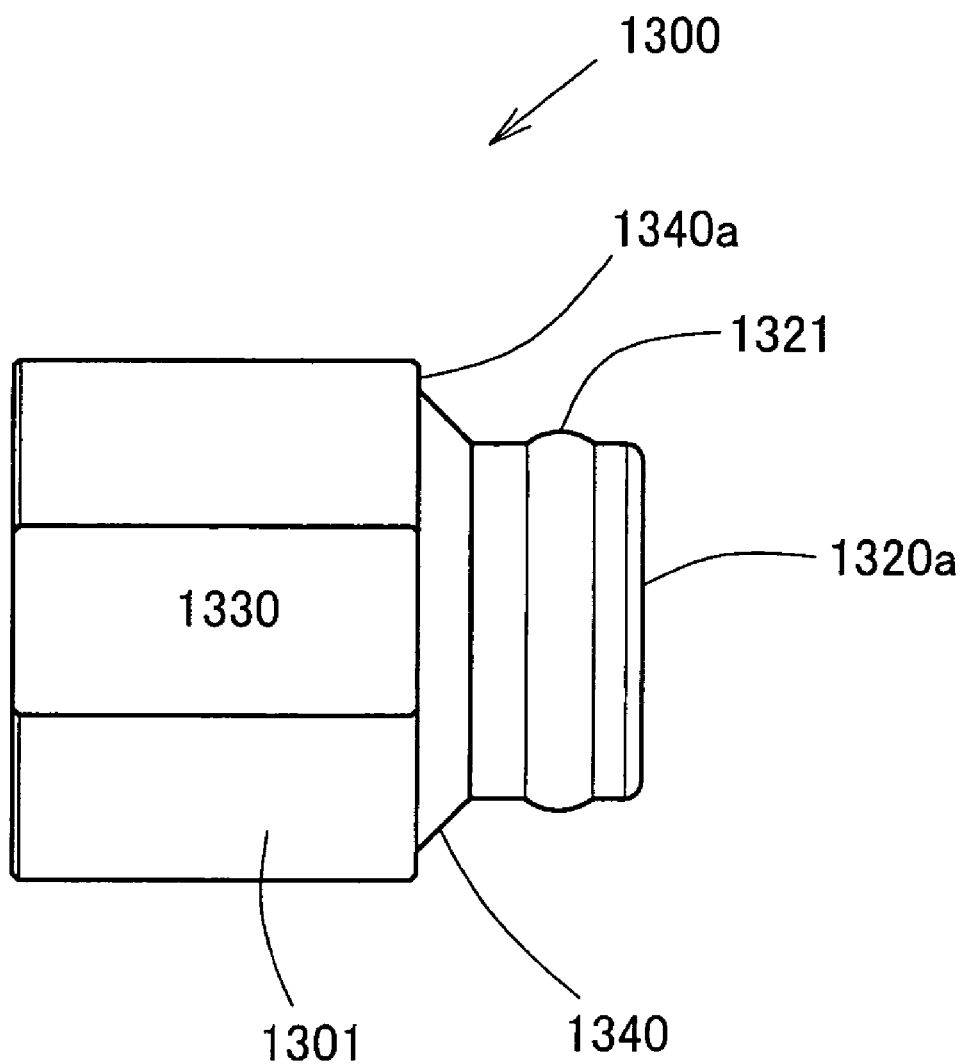
FIG. 6C is a side view of the back tubular part 1300 of the dividing sleeve holder.

FIGS. 6A, 6B and 6C are a sectional view, a back view and a side view of the back tubular part 1300 of the dividing sleeve holder, respectively. The adjacent planes 1350 and 1360 are steps each of which is a difference of the inner diameters of the internal surface of the back tubular part 1300. A back-facet 1210a of the back end opening part 1210 of the front tubular part 1200 shown in FIGS. 5A-5C is adjacent to the adjacent plane 1350, and a bottom plane of the dividing sleeve S is adjacent to the adjacent plane 1360. Here, 1340a is a plane which exists outside of the leaning shoulder part 1340 and is vertical to the optical axis direction.

A rotational asymmetric part 1330 is formed smoothly by grinding and polishing the cylindrical external surface 1301. Each position, shape and size of the rotational asymmetric part 1330 is formed rotationally symmetrical and parallel to the axis of the back tubular part 1300. The rotational asymmetric part 1330 makes a proper angle of about 40° in circumferential direction around the axis. When this angle is too large, the back end opening part 1310 tends to become too thin and that may reduce its durability. When this angle is too small, the area at which the rotational asymmetric part 1330 contact to the rotation preventing parts 1112 becomes too small and rotation of the back tubular part 1300 can hardly be restrained sufficiently. In short, the angle which the rotational asymmetric part 1330 make around the axis efficiently contributes to sufficient restrain of rotational operation of the dividing sleeve holder (dividing sleeve unit U), downsizing of the adaptor unit 1000, and maintaining strength of each part of the adaptor unit 1000.

A taper part 1320b formed in an approximately ring shape guides the end (front end part) of the ferrule to be inserted smoothly into the back tubular part 1300 of the dividing sleeve holder. And a hill part 1321 formed at the back end opening part 1320 of the back tubular part 1300 functions to fit a main body of an elastic contact point which is installed independently of the adaptor unit 1000 in the first embodiment.

Figure 7:
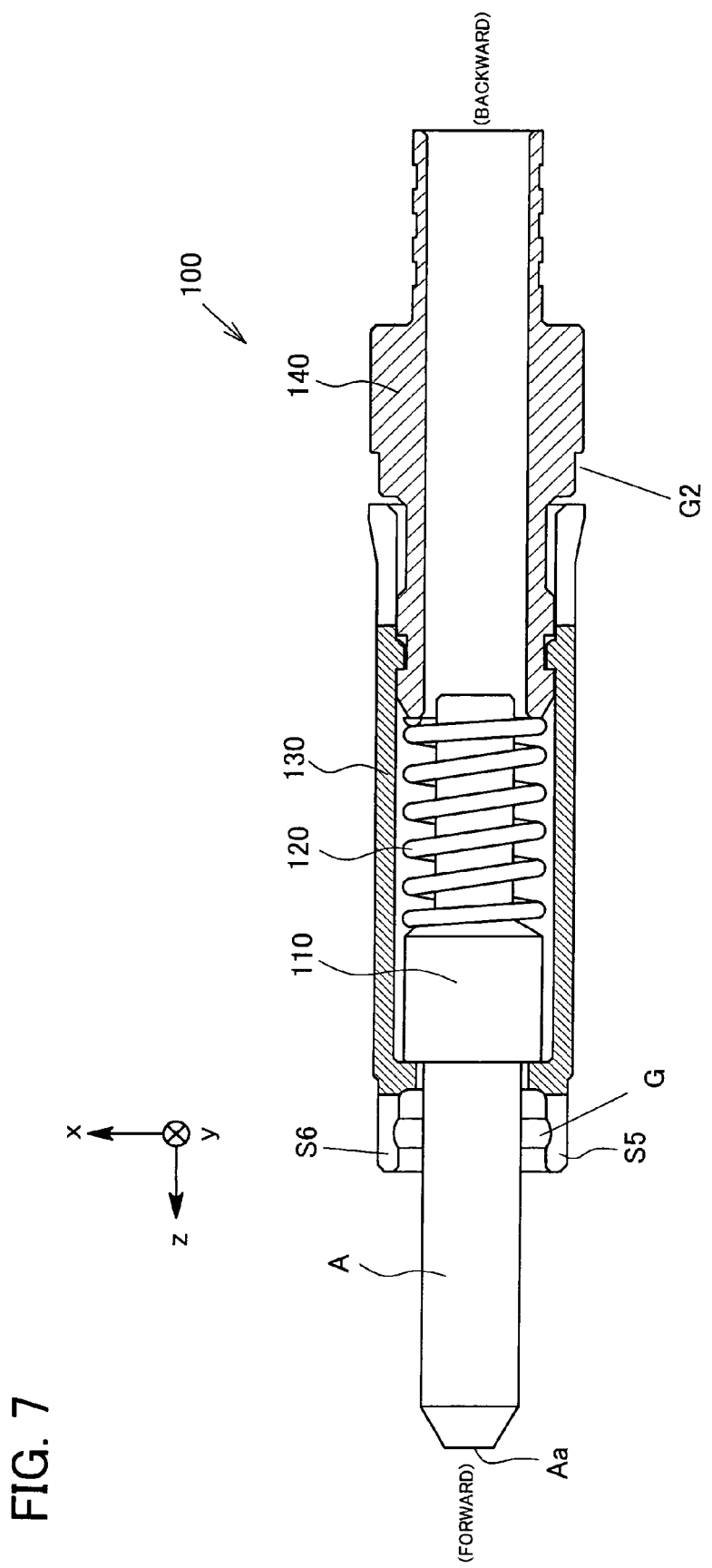
FIG. 7 is a sectional view of an optical contact unit 100 which is connected to the back tubular part 1300.

FIG. 7 is a sectional view of the elastic contact point (an optical contact unit 100) which is connected to the back tubular part 1300. A ferrule A, a ferrule holder 110, a coil spring 120, a main body 130, and a cable adaptor 140 are comprised in the optical contact unit 100 and are fixed in a shell of an objective optical plug. The ferrule A is inserted from the front facet Aa into the dividing sleeve S of the adaptor unit 1000.

The main body 130 of the optical contact unit 100 is formed in an approximately cylindrical shape, and two slits S5 and S6 running in the optical axis direction are formed at its front opening part making an angle of 180° with each other, or symmetrical to the optical axis. A groove G in an approximately ring shape is formed on the internal surface of the cylindrical front opening part of the main body where the slits S5 and S6 are formed, and the groove G fits with the hill part 1321. When the back end opening part 1320 of the back tubular part 1300 is inserted into the front opening part of the main body 130 of the optical contact unit 100, the slits S5 and S6 help to fit the units by varying the shape of the front opening part of the main body 130 to a recoverable extent. As a result, the adaptor unit 1000 can be fit firmly in the optical plug shell. This fitting operation is carried out at each dividing sleeve unit U.

Figure 11:
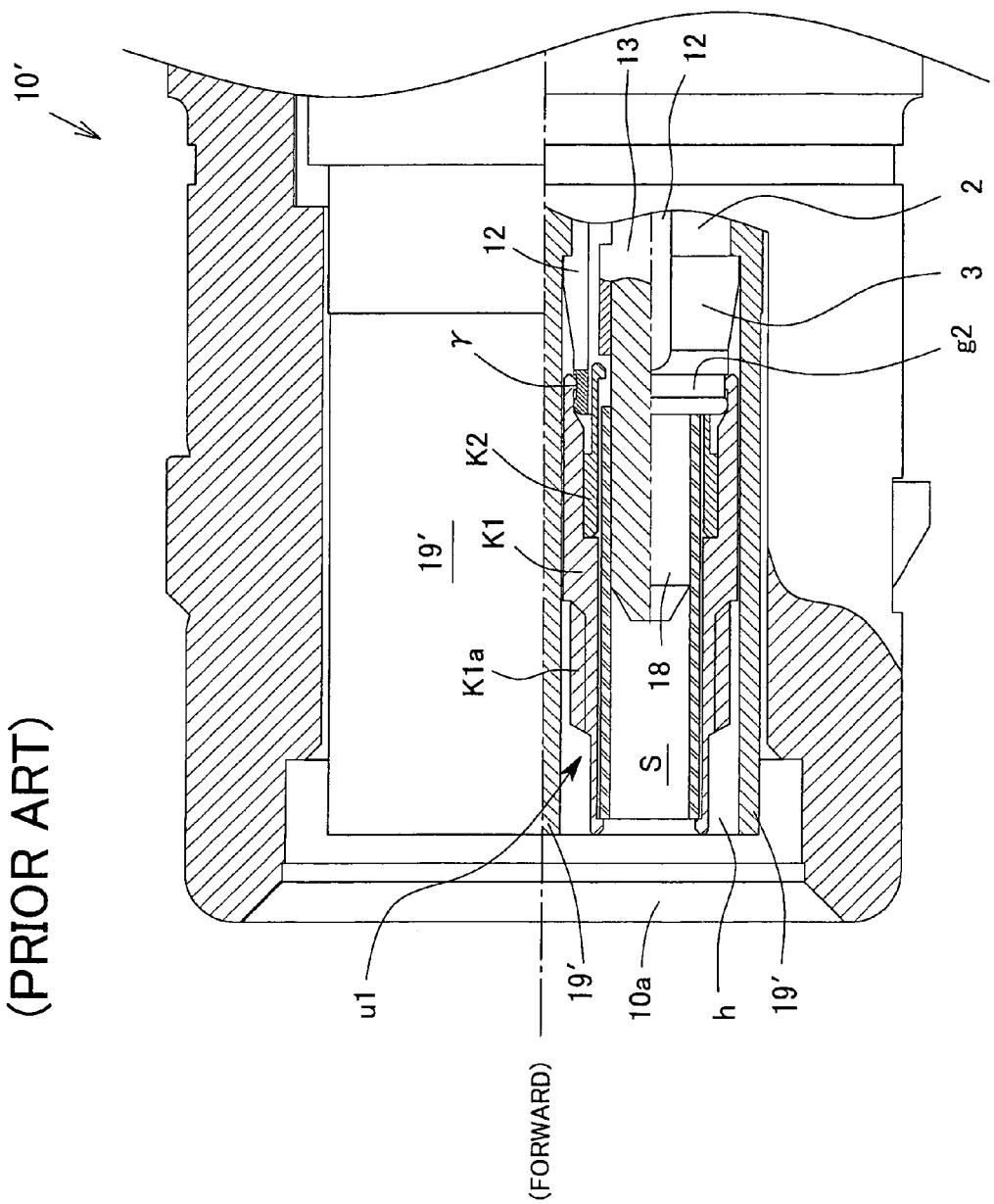
FIG. 11 is a side/sectional view of a conventional adaptor unit 19'.

The conventional dividing sleeve unit u1 shown in FIG. 11 also fits at a point γ, which is similar to that of the present embodiment. But when the dividing sleeve unit u1 picked out from the conventional optical plug 10' by using a jig, the adaptor 19' which is fixed in the opening part of the optical plug 10' is left there.

On the contrary, when the process same as that in the conventional optical adaptor 19' is carried out to the adaptor unit 1000 in the first embodiment of the present invention by using a jig, connection between the groove G and the hill part 1321 is released and further the whole body of the adaptor unit 1000 can be easily taken out from the opening part of the optical plug. In short, in the present invention, a female screw part of a jig which is an approximately cylindrical metal bar and has a female screw at its end is screwed together firmly with a male screw part (: screwing part 1220) of the front tubular part 1200. By pulling the jig forward until the hill part 1321 is released from the groove G, the adaptor unit 1000 can be released from the optical plug. By further pulling the jig forward, the whole body of the adaptor unit 1000 can be easily taken out from the opening part of the optical plug.

That is because each component in the adaptor unit 1000 is fixed to the adaptor main body 1100 either directly or indirectly as shown in FIG. 2. As explained by using FIG. 2, each component in the adaptor unit 1000 is fixed to the adaptor main body 1100 according to the following processes:

(1) First, the dividing sleeve S is inserted into the front tubular part 1200.
(2) Second, the front tubular part 1200 comprising the dividing sleeve S is inserted from forward into the large through-hole 1110 of the adaptor main body 1100.
(3) Third, the back tubular part 1300 is inserted from backward into the large through-hole 1110 of the adaptor main body 1100.

Accordingly, the dividing sleeve S is comprised in the dividing sleeve holder (the front tubular part 1200 and the back tubular part 1300). The back end opening part of the front tubular part 1200 is inserted and pressed into the front end opening part of the back tubular part 1300.

According to this composing processes described above, composing the dividing sleeve unit U shown in FIG. 4 is completed after pressing the dividing sleeve S into the large through-hole 1110 of the adaptor main body 1100. Because this fitting is sufficiently firm, the process of composing the dividing sleeve unit U is an irreversible process. That is, the front tubular part 1200 and the back tubular part 1300 are connected and fixed firmly with each other and they may not be separated. And this composing process generates a concave part Ua at the dividing sleeve unit U as shown in FIG. 4, and the concave part Ua fits firmly with the fitting part 1111 formed in the large through-hole 1110. Accordingly, the dividing sleeve unit U and the adaptor main body 1100 are composed to be one unit. In short, each components of the adaptor unit 1000 can be fixed to the adaptor main body 1100 either directly or indirectly through processes such as pressing and connecting.

Owing to that structure, the whole body of the adaptor unit 1000 can be taken out of the opening part of the optical plug easily at one time only by pulling the jig forward.

According to the first embodiment of the present invention, maintenance of the front facet of the ferrule can be carried out easily and effectively.

SECOND EMBODIMENT

Figure 8A:
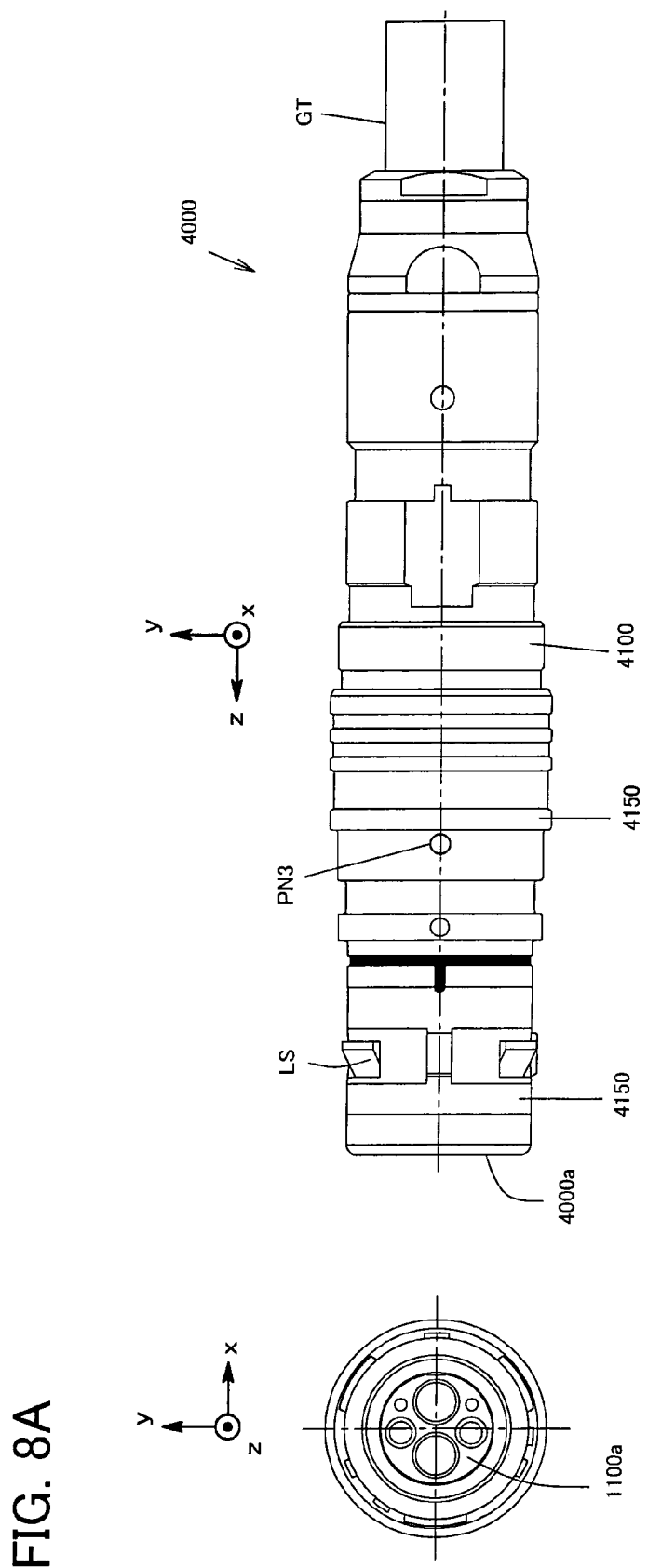
FIG. 8A is a front view and top view of an optical plug 4000 in the second embodiment of the present invention.
Figure 8B:
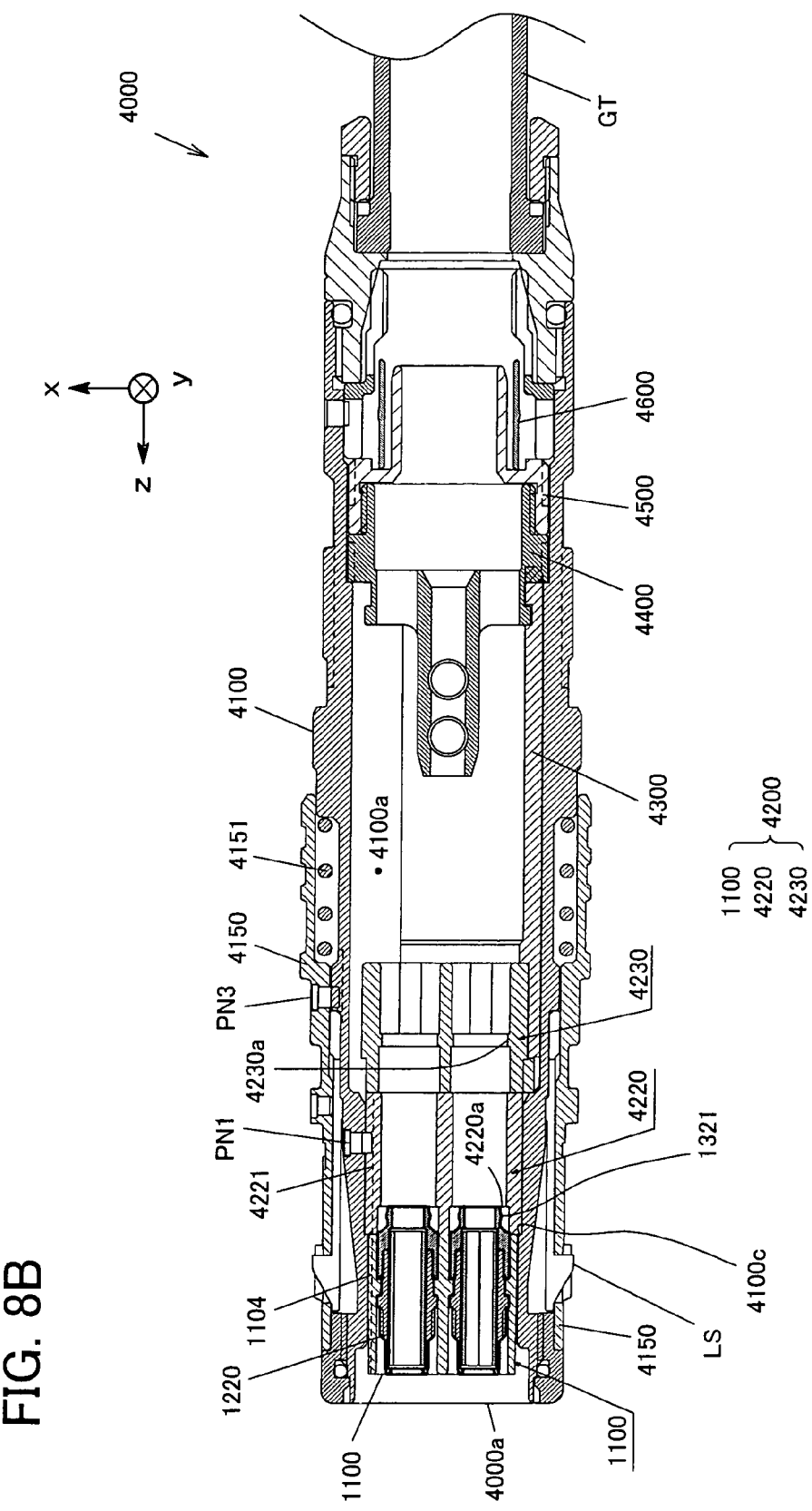
FIG. 8B is a sectional view of the optical plug 4000 in the second embodiment.
Figure 9:
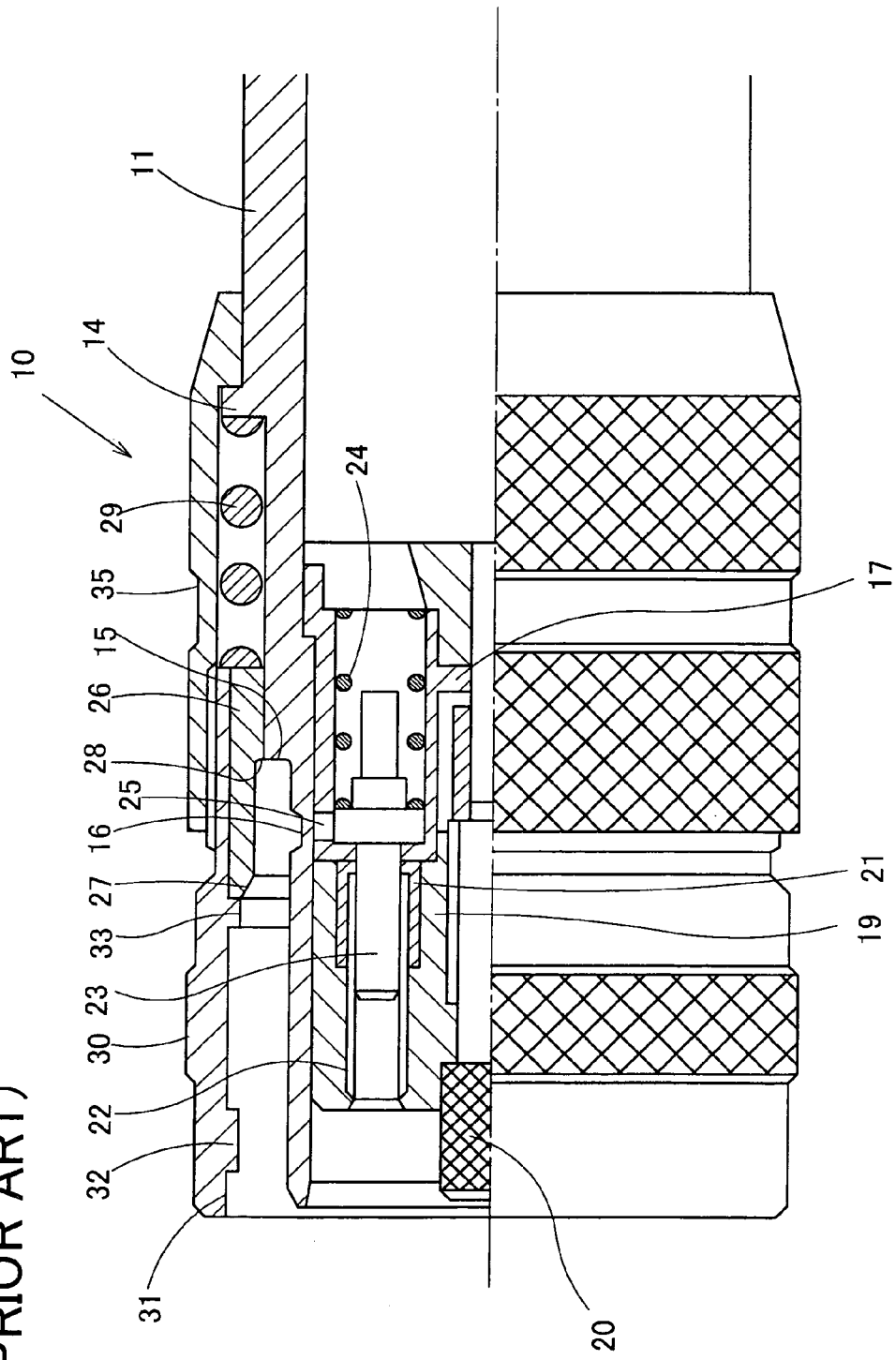
FIG. 9 is a sectional/side view of a conventional optical plug 10.
Figure 10A:
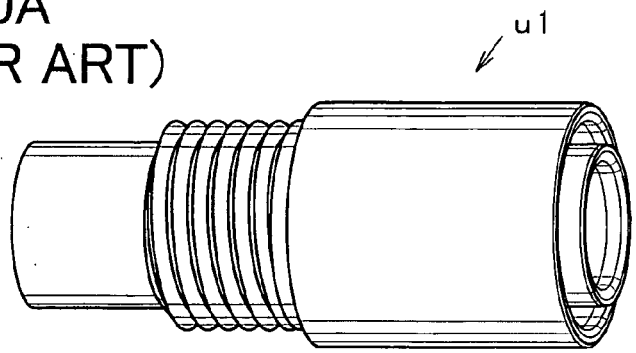
FIG. 10A is a perspective view of a conventional dividing sleeve unit u1.
Figure 10B:
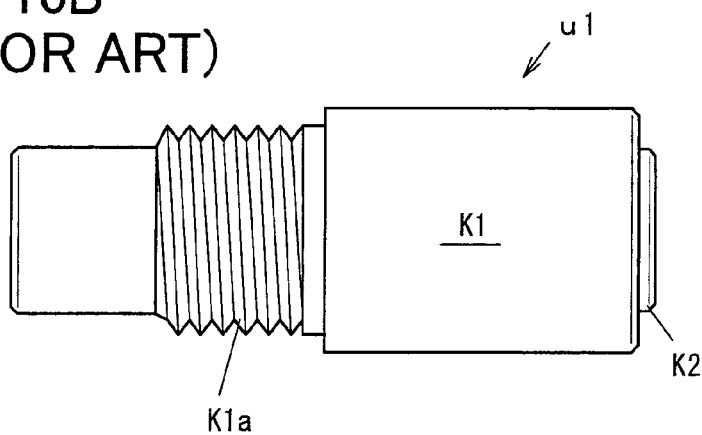
FIG. 10B is a side view of the conventional dividing sleeve/unit u1.
Figure 10C:
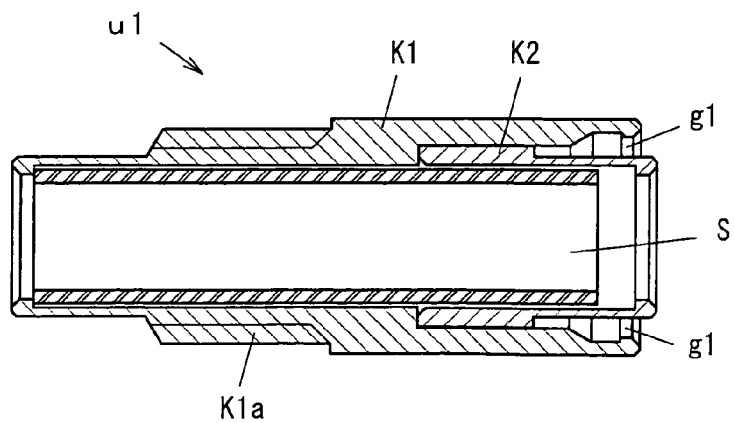
FIG. 10C is a sectional view of the conventional dividing sleeve unit u1.

FIGS. 8A and 8B show a front and top view and a sectional view of an optical plug 4000 in a second embodiment of the present invention. The optical plug 4000 comprises the adaptor unit 1000 in the first embodiment of the present invention. An agraffe 4400, a cramp body 4500, a pressure-bonding sleeve 4600, and a gum tube GT consist of a cable fixing part of the optical plug 4000. In the second embodiment, the central axis of an approximately cylindrical female plug shell 4100 is the z axis and the direction from the gum tube GT to an edge 4000a of the female plug 4000 is the positive direction of the z axis.

A slide sleeve 4150 formed in an approximately cylindrical shape is supported by a screw 4151 resiliently and guided to the z axis direction by a guide pin PN3, which enables to shuttle in the z axis direction in a predetermined range. Accordingly, a latching sleeve LS is pumped in the slide sleeve 4150 in diameter direction of the female plug shell 4100.

An insert of the female plug 4000 comprises a front part, a middle part and a rear part which are made of insulator. That is, an insulator 1100 which is formed in the same shape as that shown in FIGS. 1 and 2 in the first embodiment consists of the front part of the insert, an insulator 4220 which is shown in FIG. 8B consists of the middle part of the insert, and an insulator 4230 shown in FIG. 8B consists of the rear part of the insert. These three insulators 1100, 4220 and 4230 are collectively called an insert 4200 hereinafter.

The insert 4200 formed in an approximately cylindrical shape is inserted and installed at the inside of the internal surface 4100a of the female plug shell 4100 as illustrated in FIG. 8B, and is maintained in a condition that each end part of the transmission line can be freely fitted and separated with respect to each line to a certain male plug on which the female plug 4000 is coupled.

A concave part 1103 formed on the back 1100a of the insulator 1100 shown in FIG. 1B is formed to restrain relative rotational operation of the insulator 1100 and the insulator 4220 around the axis.

The groove 1104 and the groove 4221 formed at the insulator 1100 and the insulator 4220, respectively, are connected with each other to be one straight line. That functions as a guiding line which guides the pin PN1 in the z axis along the external surface of the insert 4200.

The groove G2 formed at the optical contact unit 100 as illustrated in FIG. 7, fits with the convex part 4231a which is formed in an approximately ring shape on the internal surface of the through-type hole 4231 comprised in the insulator 4230. This fitting can be released by using a tool.

In the process of releasing the adaptor unit 1000 in the first embodiment of the present invention, the adaptor unit 1000 is released from its front part, or the insert 4200. Because the shoulder part 4100c, which is a difference between the large diameter and the small diameter of the female plug shell 4100, the pin PN1, and the connecting member 4300 completely restrict motion of the middle part (insulation 4220) and the back part (insulator 4230) of the insert 4200 in the female plug shell 4100, the process of releasing the adaptor unit 1000 is a reversible process. In short, after the adaptor unit 1000 is pulled out from the optical plug 4000, the insert 4200 can be put back to be connected in the female plug 4000 by reversing the process: pushing the adaptor unit 1000 into the optical plug 4000.

OTHER MODIFIED EMBODIMENT

While the present invention has been described with reference to the above embodiments as the most practical and optimum ones, the present invention is not limited thereto, but may be modified as appropriate without departing from the spirit of the invention. By applying and modifying the embodiment, effect of the present invention can be obtained.

MODIFIED EMBODIMENT 1

In the first embodiment, for example, it is preferable that the adaptor main body 1100 is made of resin and the front tubular part 1200 and that the back tubular part 1300 consisting the dividing sleeve holder are made of metal concerning strength, elasticity, durability, and compatibility to the tools of each member. On carrying out the present invention, however, material for forming each member can be arbitral and may not be necessarily limited thereto.

MODIFIED EMBODIMENT 2

In the first embodiment, two dividing sleeves U are comprised in the adaptor unit 1000. Alternatively, the adaptor unit in the present invention may comprise only one dividing sleeve or three or more dividing sleeves.

Number of the through-holes for electric line, e.g., the through-holes 1101 and 1102 shown in FIG. 1B, can be arbitrary, and alternatively, any through-hole may not be necessarily formed.

MODIFIED EMBODIMENT 3

In FIG. 1B, both sides of the adaptor unit 1000 is symmetrical to the sectional plane α. And in FIG. 2, both upper and lower sides of the adaptor unit 1000 is symmetrical. Alternatively, the adaptor unit of the present invention may not be necessarily formed symmetrical. Structure of the adaptor unit may be designed concerning each object and specification.

MODIFIED EMBODIMENT 4

In the first embodiment, the front tubular part 1200 and the back tubular part 1300 are pressed and screwed together with each other. Alternatively, that fitting can be carried out by screwing a male screw and a female screw together.

MODIFIED EMBODIMENT 5

Alternatively, the through-hole the adaptor main body to which one dividing sleeve unit is inserted and arranged may comprise only one rotational preventing part or three or more rotational preventing parts. Eight rotational preventing parts, which form the through-hole in an octagon shape, may be comprised to provide sufficient rotational preventing action.

Here, proper and optimum position and number of rotational preventing parts depend on processing accuracy of the dividing sleeve holder and the adaptor main body toward the through-holes and strength of the materials of the rotational preventing parts. Although the rotational preventing part in the first embodiment which is made of assumable kinds of materials always satisfies those conditions, conditions with respect to positions and numbers of the rotational preventing part may not be limited to those in the first embodiment.

Alternatively, the rotational-preventing part which prevents rotation of the dividing sleeve unit can be formed at the front tubular part. It is sufficient that the rotational preventing part is formed either at the front tubular part or at the back tubular part. Accordingly, by limiting that the rotational preventing part is formed at either one portion, it becomes easier to form the rotational preventing part on the dividing sleeve holder.

Alternatively, the rotational preventing part can also be formed to cover the entire length of the dividing sleeve holder in the optical axis direction.

MODIFIED EMBODIMENT 6

Alternatively, the convex part which is the fitting part formed at the adaptor main body may not be necessarily formed in an approximately ring shape. It may be formed, for example, partially at the internal surface in circumferential direction. That is, the fitting part may not be necessarily formed around a circle in circumferential direction, but the convex part can be formed only at one portion of the circle.

Alternatively, the fitting part formed at the adaptor main body may use a conventional screwing part which fits a male screw and a female screw by screwing together. Further alternatively, the fitting part may be formed by using other conventional screwing part or arbitrary unique screwing part.

MODIFIED EMBODIMENT 7

Alternatively, structure of the dividing sleeve unit (the back tubular part) and the optical contact unit which is to be fitted at the back of the dividing sleeve unit may be the conventional structure shown in FIG. 11.

INDUSTRIAL AVAILABLENESS

The present invention relates to an adaptor unit comprising an optical plug which connects each front facet of two ferrules facing with each other and is installed at either male or female opening part. The optical plug may be either male or female and may be hybrid-type structure which connects electric lines as explained in the first embodiment of the present invention.

While the present invention has been described with reference to the above embodiments as the most practical and optimum ones, the present invention is not limited thereto, but may be modified as appropriate without departing from the spirit of the invention.

The present invention comprises all the contents in the priority claiming Japanese patent application No. 2004-120752.

The invention claimed is:

1. An adaptor unit for an optical plug which connects each front facet of two ferrules facing with each other and is installed at either male or female opening part, the adaptor unit comprising:
    a dividing sleeve which includes each front facet of said two ferrules and holds each front ferrules facing with each other in connecting process;
    a plurality of dividing sleeve holders, each being an approximately cylindrical dividing sleeve holder which includes and holds said dividing sleeve; and
    an adaptor main body of the adaptor unit which holds said dividing sleeve holder by including at least a portion of said dividing sleeve holder,
    wherein said adaptor main body comprises a fitting part which fits with said dividing sleeve holder to restrain movement of said dividing sleeve holder at least in the optical axis direction,
    said dividing sleeve holder comprises a front tubular part and a back tubular part which is adjacent and fixed to said front tubular part, and
    said front tubular part of said dividing sleeve holder comprises an engagement part for connecting with a predetermined jig, and
    wherein a respective said fitting part comprises a convex part which projects to the axis side of each said dividing sleeve holder and is sandwiched between said front tubular part and said back tubular part in said optical axis direction.

2. The adaptor unit according to claim 1, wherein said convex part is formed in an approximately ring shape around the axis which corresponds to the axis of said dividing sleeve holder.

3. The adaptor unit according to claim 1, wherein a back end opening part of said front tubular part is installed inside of a front end opening part of said back tubular part.

4. The adaptor unit according to claim 1, wherein said front tubular part and said back tubular part are connected and fixed with each other by inserting and pressing said back end opening part into said front end opening part.

5. The adaptor unit according to claim 1, wherein a rotational asymmetry part is formed at the external surface of said dividing sleeve holder which is asymmetric to rotation around the axis of said dividing sleeve holder, and a rotation preventing part is formed at said adaptor main body.

6. The adaptor unit according to claim 5, wherein said rotational asymmetric part and said rotation preventing part are two parallel planes sandwiching the axis of said dividing sleeve holder.

7. An optical plug which connects each front facet of two ferrules facing with each other and comprises the adaptor unit according to claim 1.

8. The adaptor unit according to claim 1, wherein said front and back tubular parts are integrally formed by press connecting.

9. The adaptor unit according to claim 1, wherein said dividing sleeve holder front tubular part fixes integrally to said back tubular part so as to engage the fitting part.

10. The adaptor unit according to claim 1, wherein said fitting part is sandwiched between said front tubular part and said back tubular part.

11. The adaptor according to claim 1, wherein said convex part of said adaptor main body abuts a convex part of said front tubular part.

12. The adaptor unit according to claim 1, wherein each of the dividing sleeve holders is formed in an approximately cylindrical shape to hold said dividing sleeve.

13. An adaptor unit for an optical plug which connects each front facet of two ferrules facing with each other and is installed at either male or female opening part, the adaptor unit comprising:
   a dividing sleeve which includes each front facet of said two ferrules and holds each front ferrules facing with each other in connecting process;
   an approximately cylindrical dividing sleeve holder which includes and holds said dividing sleeve; and
   an adaptor main body of the adaptor unit which holds said dividing sleeve holder by including at least a portion of said dividing sleeve holder,
   wherein said adaptor main body comprises a fitting part which fits with said dividing sleeve holder to restrain movement of said dividing sleeve holder at least in the optical axis direction,
   said dividing sleeve holder comprises:
      a front tubular part; and
      a back tubular part which is adjacent and fixed to said front tubular part, and
   said front tubular part of said dividing sleeve holder comprises an engagement part for connecting with a predetermined jig,
   wherein said engagement part comprises a screwing part for screwing together with said jig and the screw axis direction of said screwing part approximately corresponds to said optical axis direction, and
   wherein when said screwing part is screwed together with said jig, the adapter unit is separable from a female plug by pulling on said jig.

14. The adaptor unit according to claim 13, wherein said fining part comprises a convex part which projects to the axis side of said dividing sleeve holder and is sandwiched between said front tubular part and said back tubular part in said optical axis direction.

15. The adaptor unit according to claim 14, wherein said convex pan is formed in an approximately ring shape around the axis which corresponds to the axis of said dividing sleeve holder.

16. The adaptor unit according to claim 13, wherein a back end opening part of said front tubular part is installed inside of a front end opening part of said back tubular part.

17. The adaptor unit according to claim 13, wherein said front tubular part and said back tubular part are connected and fixed with each other by inserting and pressing said back end opening part into said front end opening part.

18. The adaptor unit according to claim 13, wherein a rotational asymmetry part is formed at the external surface of said dividing sleeve holder which is asymmetric to rotation around the axis of said dividing sleeve holder, and a rotation preventing part is formed at said adaptor main body.

19. The adaptor unit according to claim 18, wherein said rotational asymmetric part and said rotation preventing pan are two parallel planes sandwiching the axis of said dividing sleeve holder.

* * * * *